(12) United States Patent
Sargent

(10) Patent No.: US 8,794,967 B2
(45) Date of Patent: Aug. 5, 2014

(54) FIREARM TRAINING SYSTEM

(76) Inventor: Willis Hubbard Sargent, Rehoboth, DE (US)

(*) Notice: Subject to any disclaimer, the term of this patent is extended or adjusted under 35 U.S.C. 154(b) by 1175 days.

(21) Appl. No.: 12/631,799

(22) Filed: Dec. 4, 2009

(65) Prior Publication Data

US 2010/0201620 A1    Aug. 12, 2010

Related U.S. Application Data

(60) Provisional application No. 61/120,373, filed on Dec. 5, 2008.

(51) Int. Cl.
*F41A 33/00* (2006.01)
(52) U.S. Cl.
USPC ............................................. 434/19; 434/11

(58) Field of Classification Search
USPC ...................................................... 434/11–29
See application file for complete search history.

(56) References Cited

U.S. PATENT DOCUMENTS

2008/0233543 A1* 9/2008 Guissin ........................... 434/19

* cited by examiner

*Primary Examiner* — Timothy A Musselman

(57) ABSTRACT

The present invention provides a firearm training system for actual and virtual moving targets comprising a firearm, a trigger-initiated image-capturing device mounted on a firearm, a processor, and a display. The system allows a user to visualize the accuracy of a shot taken when the trigger was pulled or the gun fired by showing the predicted position of the firearm's projectile in relation to the moving targets.

6 Claims, 3 Drawing Sheets

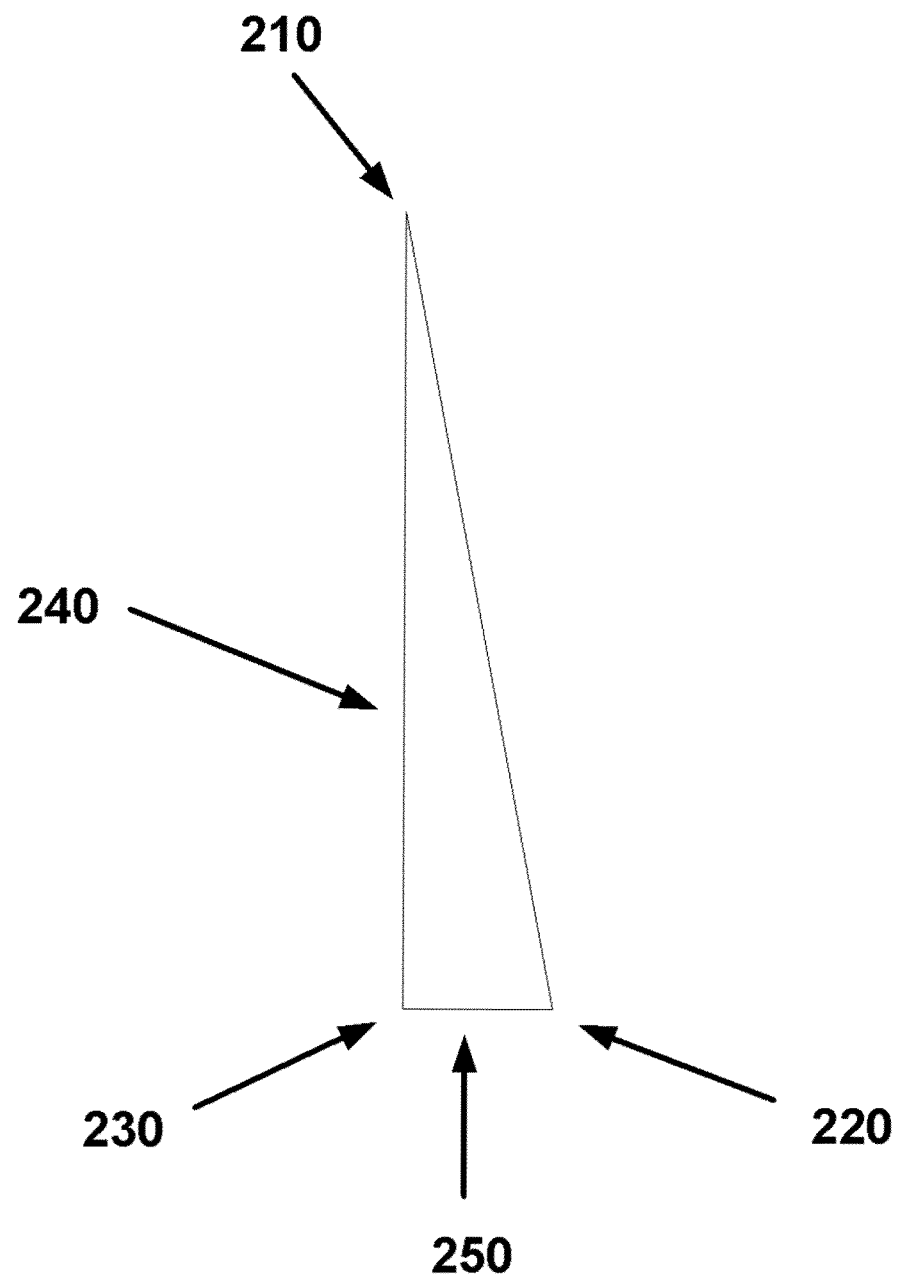

Camera #1 Image
50 yards

Camera #2 Image
50 yards

Calibration Calculation
50 yards

Camera #1 Image
20 yards

Camera #2 Image
20 yards

Calibration Calculation
20 yards

FIREARM TRAINING SYSTEM

CONTINUATION

This application claims the benefit of U.S. Provisional Application No. 61/120,373 filed Dec. 5, 2008, the entire contents of which are incorporated by reference herein.

BACKGROUND OF THE INVENTION

When you shine a flashlight at a moving target you must point directly at the target. Even though the target moves, it moves very slowly compared to the speed of light coming from the flashlight. In contrast to the flashlight, when you attempt to shoot a shotgun at a moving target you must compensate for the direction and speed of the target, even though the target moves much slower than the speed of the shotgun's pellets. For example, many targets move at 40 miles per hour, which is 58.7 feet per second.

(40 mph×5280 ft)/(60 min×60 sec)=58.7 feet per second

Shotgun pellets leave a gun at about 1200 feet per second, and if the target is 30 yards away, then with no loss of speed it would take about 0.075 seconds for the pellets to travel to the target. However, pellets tend to lose speed, and the speed would be less than 800 feet per second at 30 yards. Thus the actual time would be close to 0.100 seconds. Since the target is moving at almost 60 feet per second, then the target will move almost six feet in the time it takes for the pellets to reach the target.

A typical shotgun shell (Target load) will have around 400 pellets, and at 30 yards most of the pellets will be contained within a 30 inch circle. Thus if you aim directly at the target you will miss the target by nearly five feet.

(58.7 feet×12 inches×0.1 second)−(30 inches/2)=55 inches

The problem with hitting moving targets is helped greatly for some types of guns, such as a machine gun mounted on a airplane, by using tracer bullets. They provide visual feedback as to where the bullets are going relative to the intended target. However, with shotgun pellets, even though you are able see when a target has been hit, you still might be 12 inches off the center of the target and not know whether you were slightly ahead or slightly behind the target. And worse, if the target was not hit, there is no indication of where the center of the pellets went in relation to the target. It would be ideal if we could have a picture of the target and the pellets when the pellets have just entered the plane of the target. This might be done with powerful cameras that were radar controlled, but even then it would be hard to see the pellets against a bright sky at shotgun range.

The present invention provides a firearm training system for actual or virtual moving targets comprising a firearm, a trigger-initiated image-capturing device mounted on a firearm, a processor, and a display. The system allows a user to visualize the accuracy of a shot by showing the computed position of a firearm's projectile in relation to the target at the time that the projectile comes closest to the target.

SUMMARY OF THE INVENTION

The present is directed to a firearm training system for moving targets comprising a firearm, a trigger-initiated image-capturing device mounted on a firearm, a processor, and a display. The image-capturing device captures at least two stereo images of the moving target along the moving target's path when the trigger is pulled by a user. Preferably, the image-capturing device comprises two image-capturing devices (or one image capturing device capable of capturing two images of the moving target from different positions) mounted on either side of the firearm's barrel or barrels. The images are communicated to a processor, which then determines the distance between the firearm and the moving target as well as the speed and direction of the moving target when the trigger of the firearm was pulled. The processor also determines a predicted position of the firearm's projectile in relation to the moving target, whether the target is actual (e.g., a flying bird) or virtual (e.g., a simulated flying bird displayed on a display screen), and displays the predicted projectile position superimposed over an image of the moving target on the display, enabling a user to visually assess the accuracy of a shot aimed at the moving target. The processor and the display could be mounted on the gun or could be part of a separate computing device (such as a laptop computer, personal digital assistant, or a cell phone with a visual display). In a preferred embodiment, the firearm is a shotgun and the projectile is a plurality of shot. In another preferred embodiment, the moving target is a bird or a clay pigeon.

DESCRIPTION OF THE FIGURES

FIG. 2 provides a schematic view of the stereo range finding system.

DETAILED DESCRIPTION OF THE INVENTION

Figure 1:
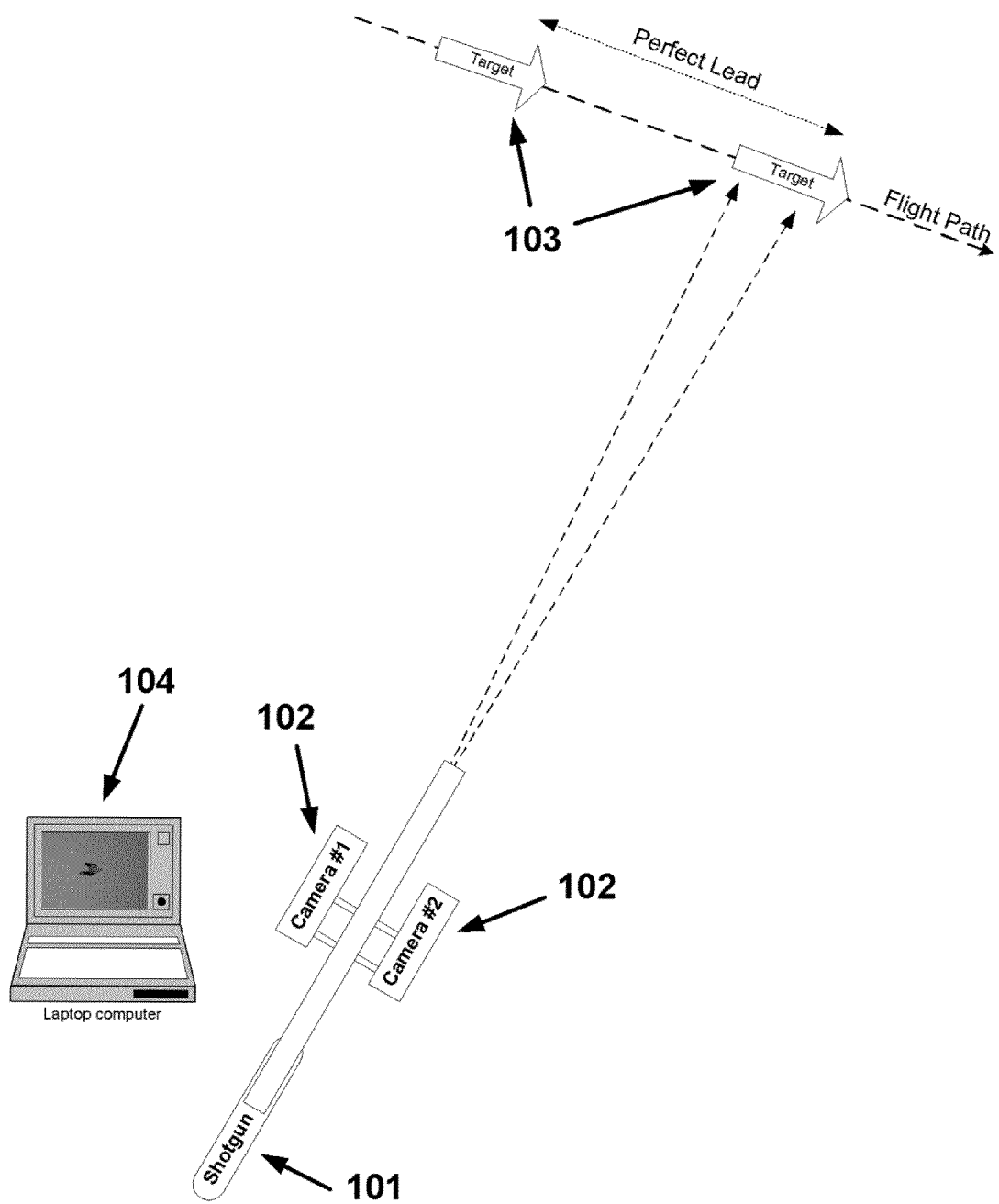
FIG. 1 provides a schematic of a preferred embodiment of the firearm training system.

The present invention is directed to a firearm training system that enables a user to analyze shooting accuracy based on the pattern, speed, direction and distance of the shot, in relation to an the speed, direction and distance of the moving target.

The firearm 101 has mounted thereon an image-capturing device 102, capable of capturing a digital photographic image. Preferably, for actual targets there are at least two image-capturing devices 102 mounted on either side of the firearm 101, which permit stereoscopic range finding. The image-capturing device 102 may be in the form of a scope or other suitable device that can be appropriately mounted on the firearm 101. The image-capturing device 102 is activated by a trigger-deployment detection means 105. A suitable trigger-deployment detection means 105, which may be a pressure sensor mounted on a trigger of the firearm that is connected (wirelessly or by wired connection) to the image-capturing device(s) 102 to detect when the trigger is pulled, with or without ammunition loaded, is used to activate the image-capturing device 102. In another embodiment, another kind of sensor may be used to activate the image-capturing device 102 such as a sound detector, which detects the firing of a gun. For example, a trigger-deployment detection means 105 may include any known sensors detecting trigger deployment such as a motion detector, pressure sensor, electronic sensor, magnetic sensor, or combination thereof. The image-capturing device 102 is activated in response to the trigger-deployment detection means 105 sensing the trigger was pulled or the gun fired. Upon activation, the image-capturing device 102 captures the image of at least two different points of a moving target's 103 path. The image-capturing device 102 should be capable of communicating and sending the image captured to a processor 104. Preferably, the image-capturing device 102 communicates wirelessly with the processor 104, such as through Bluetooth technology or other suitable and known technologies.

The processor 104 is preferably an external computer or a processor chip mounted on the gun, which can determine the distance between the firearm 101 and the moving target 103. The processor 104 is also capable of communicating by wire or wirelessly with the image-capturing device 102, for example, through Bluetooth or other suitable technology. The processor 104 operates preferably by analyzing the offset of the image from the right camera from the image from the left camera, i.e., stereoscopic range finding.

Preferably, several thousandths of a second after the trigger is pulled or the gun fired a second pair of images is taken by the image capturing device 102. The processor 104 again determines where the moving target 103 is located and then where the moving target 103 should be at the moment of impact (i.e., the moment pellets should come closest to the moving target 103). Optionally, additional images are captured and analyzed if time is available to add precision to the calculation of the moving target 103 position.

In one embodiment, before tracking a moving target 103, the user optionally may input information into the processor 104, which is configured to handle multiple gun types, about the gun used (gauge and choke) and the shell used (shot size, and powder load). These inputs are important because a 12 gauge will have more pellets than a 20 gauge, a tighter choke will develop more pellets in a tighter circular pattern, larger shot/pellet size will travel further and faster, but have fewer pellets, and powder load will affect initial pellet velocity. In other embodiments, the system may be configured for only a single gun type and no input by the user is required in advance of operation.

From the above data and moving target 103 position, the processor 104 calculates the moment of predicted impact between the moving target 103 and the shot from the firearm 101 or the moment that the shot comes closest to the target. Optionally, a final image is captured by the image capturing device 102 at the moment of impact and to that image is added a display of the predicted pattern of shot pellets relative to the target, said predicted pattern of shot pellets being determined by the processor 104.

In a preferred embodiment, the invention permits users to replay sequences of shots, and analyze shooting patterns (for example, generally shooting behind and under targets), and supports competitive exercises between many shooters or in "solitaire" mode for single shooters.

The moving target 103 may be live targets, such as doves, ducks, or geese, or practice targets, such as clay pigeons or virtual targets shown on a computer or TV screen or projected on a wall. The invention works better with live targets if there is sky or cloud background against which the live target stands out clearly to facilitate image capture and recognition of the target by the processor 104. When practice moving targets 103 are used, using bright colors can facilitate recognition.

The present invention further may be configured for simulated or virtual shooting systems, such as video games where a display screen shows the moving target 103 and the firearm 101 is, for example, a simulated shotgun which a user aims at the display screen or at a projected image on a wall or screen.

Stereo Range Finding

Humans and the vast majority of animals have two eyes generally a few inches apart. Brains are able to determine distance in part because known objects appear larger when they are closer. However, it is much easier to judge distance using two eyes instead of one, because our brains are also able to sense very small differences in the angles of the sight line of each eye to the target. There is virtually no angular difference to objects on the horizon but the angular difference increases as objects come closer. With stereo cameras the angular difference can be measured as a function of how far the image from the camera to the right is offset from that of the camera to the left of the gun barrel relative to the known offsets of given distances.

The lines between a target 210 and two cameras 220 and 230 form a right triangle as shown in FIG. 2, and the ratio of the distance between the cameras (Side A 250) and the distance to the target (Side B 240) is equal to the trigonometric function known as the tangent. Studies of actual digital stereo images show that the number of pixels that the image of the camera to the right must be shifted to match the image of the camera to the left follow a pattern that is very close to a tangent series, but which differs slightly due to the properties of the lenses used. With a given set of camera lenses the distance to the target can always be determined from the number of pixels that the image must be shifted by interpolating between the shifts that occur at known distances.

In a preferred embodiment, the system comprises the following components:

A shotgun of any type or gauge.

A supplementary device on the trigger that sends a signal when sufficient pressure has been applied to the trigger or a supplementary device on the gun that senses when the gun has been fired, either with or without live ammunition.

A mounting bracket that holds left and right cameras apart at a fixed distance (approximately ten inches).

Preferably, left and right cameras 102, each having a set optical magnification of approximately six and at least 1.5 million pixels.

A communication device, such as a Bluetooth receiver/transmitter, which allows the image-capturing device 102 to wirelessly communicate with the processor 104

A processor and display, such as a laptop computer 104. Preferably, the computer is compact, has a touch screen and will operate on a single charge for over 5 hours. A processor and display could also be mounted on the gun or could be located within a device such as a cell phone. Any processor may optionally include sufficient storage of shot history data for subsequent analysis of performance.

A communicative device or property of the processor, which supports a direct or a wireless connection such as with a Bluetooth receiver/transmitter attached to the computer 104 or incorporated in the computer 104, which allows the processor to communicate with the image-capturing device 102.

A software program incorporated in the processor/computer 104 to (a) calculate target distance and speed; (b) calculate target position in space; (c) calculate moment of impact; (d) calculate shot pattern; (e) display shot pattern superimposed on target image; and (e) store and review performance data Technology As depicted in FIG. 1, the present invention preferably includes (1) two electronic imaging cameras, mounted on a shotgun; (2) an attachment to the gun's trigger that signals the instant the trigger is pulled or an attachment to the gun that indicates that the gun has been fired, with or without live ammunition; (3) blue-tooth communication between cameras, trigger and processor; (4) calibration targets and software to determine the pixel offset for selected distances from each camera; (5) software that determines target distance from the extent to which the image from the second camera has to be shifted to match the image of the first camera; (6) software that determines target flight path vector from a second set of images; (7) software that predicts the moment that the center of the pellet's shot pattern comes closest to the target; (8) software that predicts shot pattern and distance over time based on considering gun bore, choke, powder type, powder load and shot size; and (9) software that computes the number and velocity of pellets that would have hit the target and the probability of successfully hitting or killing the target based on tables similar to Tables 1-3.

The following description of a system relating to one embodiment of the invention is provided merely for illustration and is in no way intended to limit the scope of the invention.

Computer System

Menu Structure
File
  New
  Open
  Save
Settings
  Tab Location (Top, Left, Bottom, Right)
  Bore (e.g., 10, 12, 20, 28, 0.410 gauge)
  Choke (e.g., modified, full, etc.)
  Shot Size (e.g., 7½, 8, 9, etc.)
  Velocity at various points
  Color Recognition for Clay Targets
Calibrate
  Target Distance
Current Shot
  Hit probability—probability of a hit by at least one pellet
  Kill probability—probability of a hit by at least "x" pellets within a given range
  Computed Aiming Error—(Behind 22 inches, Below 4 inches)
  Computer generated shot superimposed on actual picture
Review
  All Shots:
  Next Previous Buttons
  Summary of Errors
  Competitive Exercises Shotgun Ballistics Tables Shotgun ballistic tables, shown in Tables 1-3 from published sources, provide information relevant for inputting into the processor 104, as discussed above.

TABLE 1

VELOCITY/ENERGY EXTERIOR BALLISTICS - SHOTGUN

| | Velocity (f.p.s) at | | | | | | | Energy in ft./lbs. per pellet at | | | | | |
| --- | --- | --- | --- | --- | --- | --- | --- | --- | --- | --- | --- | --- | --- |
| Shot Size | f.p.s. at Muzzle | 10 yds. | 20 yds. | 30 yds. | 40 yds. | 50 yds. | 60 yds. | Muzzle | 10 yds. | 20 yds. | 30 yds. | 40 yds. | 50 yds. | 60 yds. |
| 7½ | 1,295 | 1,070 | 910 | 795 | 705 | 630 | 575 | 4.63 | 3.16 | 2.30 | 1.74 | 1.37 | 1.10 | 0.91 |
| 7½ | 1,240 | 1,035 | 885 | 770 | 690 | 620 | 560 | 4.24 | 2.94 | 2.16 | 1.64 | 1.30 | 1.06 | 0.87 |
| 7½ | 1,220 | 1,020 | 875 | 765 | 680 | 615 | 560 | 4.11 | 2.86 | 2.11 | 1.62 | 1.28 | 1.04 | 0.86 |
| 7½ | 1,200 | 1,005 | 865 | 760 | 675 | 610 | 555 | 3.97 | 2.79 | 2.06 | 1.59 | 1.26 | 1.02 | 0.85 |
| 7½ | 1,145 | 965 | 835 | 735 | 655 | 595 | 540 | 3.62 | 2.57 | 1.93 | 1.49 | 1.19 | 0.97 | 0.81 |
| 8 | 1,255 | 1,035 | 880 | 765 | 675 | 605 | 550 | 3.69 | 2.50 | 1.80 | 1.36 | 1.07 | 0.86 | 0.70 |
| 8 | 1,235 | 1,020 | 870 | 755 | 670 | 600 | 545 | 3.57 | 2.43 | 1.76 | 1.33 | 1.05 | 0.84 | 0.69 |
| 8 | 1,220 | 1,010 | 860 | 750 | 665 | 595 | 540 | 3.48 | 2.38 | 1.73 | 1.32 | 1.03 | 0.83 | 0.69 |
| 8 | 1,200 | 995 | 850 | 745 | 660 | 590 | 540 | 3.37 | 2.32 | 1.69 | 1.29 | 1.02 | 0.82 | 0.68 |
| 8 | 1,165 | 970 | 835 | 730 | 650 | 585 | 530 | 3.18 | 2.21 | 1.62 | 1.24 | 0.98 | 0.80 | 0.66 |
| 8 | 1,155 | 965 | 830 | 725 | 645 | 580 | 530 | 3.18 | 2.18 | 1.60 | 1.23 | 0.97 | 0.79 | 0.65 |
| 8 | 1,145 | 960 | 825 | 720 | 640 | 580 | 525 | 3.07 | 2.15 | 1.58 | 1.22 | 0.96 | 0.78 | 0.65 |
| 9 | 1,200 | 975 | 820 | 710 | 625 | 555 | 505 | 2.38 | 1.57 | 1.11 | 0.83 | 0.64 | 0.51 | 0.42 |
| 9 | 1,165 | 950 | 805 | 695 | 615 | 550 | 495 | 2.24 | 1.49 | 1.07 | 0.80 | 0.62 | 0.50 | 0.41 |
| 9 | 1,155 | 945 | 800 | 695 | 610 | 545 | 495 | 2.20 | 1.47 | 1.06 | 0.79 | 0.62 | 0.49 | 0.40 |

TABLE 2

APPROXIMATE NUMBER OF PELLETS PER LOAD

| Ounces | 9 | 8 | 7½ | 6 | 5 | 4 | 2 | BB | #4 Buck | #3 Buck | #1 Buck | #0 Buck | #00 Buck |
| --- | --- | --- | --- | --- | --- | --- | --- | --- | --- | --- | --- | --- | --- |
| 1⅜ | | | | 309 | | 186 | 124 | 69 | | | 16 | 12 | |
| 1¼ | 731 | 513 | 438 | 281 | 213 | 169 | 113 | 63 | 27 | | | | |
| 1⅛ | 658 | 461 | 394 | 253 | 191 | 152 | 101 | | | 12 | | | 9 |
| 1 | 585 | 410 | 350 | 225 | 170 | 135 | 90 | | 20 | | | | |
| ⅞ | 512 | 359 | | 197 | 149 | 118 | | | | | | | |
| ¾ | 439 | | 263 | 169 | 128 | 101 | | | | | | | |
| ⅛ | 293 | | 175 | 113 | 85 | 68 | | | | | | | |

TABLE 3

CHOKE & PATTERN PERCENTAGES

|  | Choke | % over Cyl. | Pattern % |
|---|---|---|---|
| Over Choke | .055" | 27% | 67% |
| Full | .040" | 35% | 75% |
| Imp. Mod. | .030" | 33% | 73% |
| Mod. | .020" | 27% | 67% |
| Imp. Cyl. | .010" | 17% | 57% |
| Skeet | .005" | 13% | 53% |
| Cyl. | .000" | — | 40% |

Calibration

Figure 3A:
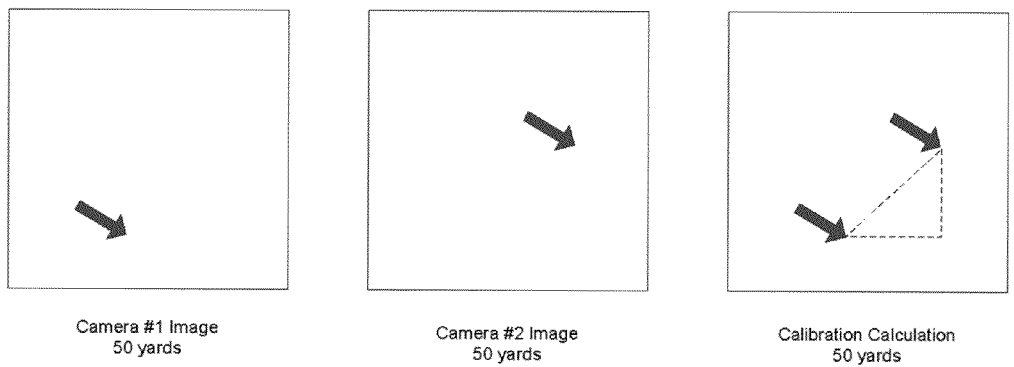
FIG. 3 provides a schematic of how the calibration works using the camera images.
Figure 3B:
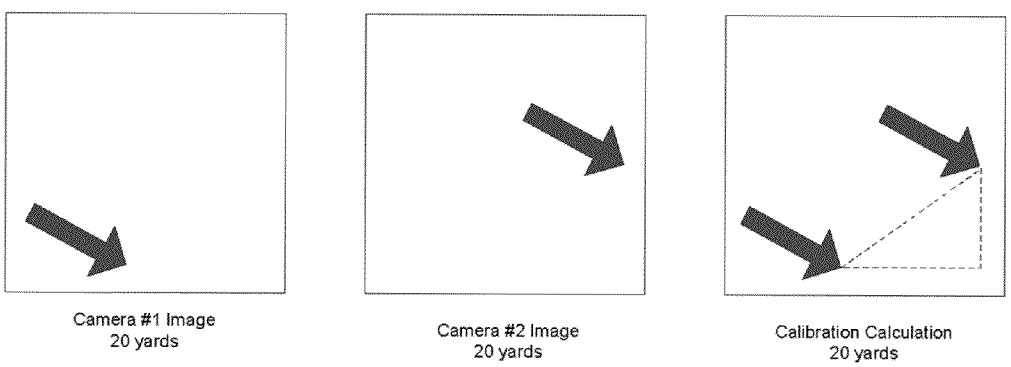

An example of how the calibration is conducted is represented in FIG. 3.

Camera images are composed of many pixels. Inexpensive small cameras generally have more than 1,000×1,000 pixels, but only 500×500 pixels might be needed since communication and processing speed will favor limiting the number.

The cameras need only point in the same general direction. Software can align the image from the second camera with that of the first camera. For example, as depicted in FIG. 3, at 50 yards the image might have to be shifted right 100 pixels and down 10 pixels.

The images from closer targets will be larger, and require more shifting to align the images. Thus calibration only requires taking images from two known locations. Subsequently target distance can then be calculated from the amount of shifting required to align the camera images.

Calibration—The Mathematics

If you know the distance between two observation points trigonometry provides a simple way to determine the distance of an object from the observation points based on the angles of the site lines to the target.

Camera images are composed of many pixels. Inexpensive small cameras generally have more than 1,000×1,000 pixels, but we might only need 500×500 pixels. Communication and processing speed possibly will favor limiting the number.

The cameras need only point in the same general direction. Software can determine the color and intensity of each pixel and then can determine how to align closely the image from the second camera with that of the first camera. For example, at 50 yards the image might have to be shifted right 100 pixels and down 10 pixels.

The images from closer targets will be larger, and require more shifting to align the images. Thus, calibration only requires taking images from two known locations. Subsequently target distance can then be calculated from the amount of shifting required to align the camera images.

Manual tests using two inexpensive cameras show that distances up to 60 yards can be resolved within one yard.

I claim:

1. A firearm training system for moving targets comprising a firearm, a sensor to detect trigger deployment, at least two image-capturing devices mounted on a firearm, a processor, and a display, wherein upon detection of trigger deployment, each image-capturing device is initiated to capture at least one image of the moving target when a shot is fired by a user of the firearm to provide at least two images from the image-capturing devices, wherein the processor receives information from the at least two images from the image-capturing devices and, utilizing stereoscopic range finding based on the information from the at least two images from the image-capturing devices, determines an approximate location of the shot in relation to the moving target, and wherein information is displayed on the display about the location of the shot in relation to the moving target, wherein said each image-capturing device is mounted on either side of the firearm's barrel or barrels.

2. The system of claim 1, wherein the processor further determines a predicted position of the shot in relation to the moving target and displays the predicted position superimposed over an image of the moving target on the display, whereby a user can visually assess accuracy of a shot aimed at the moving target.

3. The firearm training system of claim 1, wherein the firearm is a shotgun and the projectile is a plurality of shot.

4. The firearm training system of claim 1, wherein the moving target is a bird.

5. The firearm training system of claim 1, wherein the moving target is a clay pigeon.

6. The firearm training system of claim 1, wherein each of the image-capturing devices capture at least two images of the moving target.

* * * * *